United States Patent [19]

Sollami

[11] Patent Number: 4,576,528
[45] Date of Patent: Mar. 18, 1986

[54] ROTARY TOOL HOLDER

[76] Inventor: Phillip A. Sollami, 1300 E. Pine, Herrin, Ill. 62948

[21] Appl. No.: 588,922

[22] Filed: Mar. 13, 1984

[51] Int. Cl.$^4$ .......... B24B 19/00; B23Q 5/22; B23B 31/24
[52] U.S. Cl. .................... 408/140; 279/38; 51/225
[58] Field of Search .......... 51/225, 237 R, 217 T; 81/471, 473, 476; 408/140; 279/38, 51, 58, 41 R, 41 A

[56] References Cited

U.S. PATENT DOCUMENTS

| 895,438 | 8/1908 | Delany | 279/38 |
|---|---|---|---|
| 2,672,714 | 3/1954 | Wilson | 51/225 X |
| 3,025,646 | 3/1962 | Thompson | 51/237 R X |
| 3,208,316 | 9/1965 | Scribner | 81/476 |
| 4,028,763 | 6/1977 | Jenner | 408/140 X |
| 4,341,046 | 7/1982 | Pollington | 51/225 |

FOREIGN PATENT DOCUMENTS 1583832  2/1981  United Kingdom ............ 279/58

Primary Examiner—Frederick R. Schmidt
Assistant Examiner—Debra S. Meislin
Attorney, Agent, or Firm—Edmond T. Patnaude

[57] ABSTRACT

A rotary tool holder for use with an automatic or semi-automatic tool grinding machine is disclosed. The tool holder includes a rotating collet and spindle. The spindle is driven through a torque limiting coupling for protection against lock up. A shaft is connected to the spindle through the torque limiting coupling which includes a disc spring made up of a plurality of concave-convex shaped discs in frictional engagement with the shaft and the spindle. The disc spring will slip at a given torque during lock up. A fluid responsive collet actuator is provided for automatic opening and closing of the collet.

13 Claims, 5 Drawing Figures

ROTARY TOOL HOLDER

BACKGROUND OF THE INVENTION

This invention relates to cutting tool holders. More particularly, the invention relates to holders of the type having a rotary automatic opening and closing collet.

Applications, such as sharpening of drill bits, often require that the drill bit be continuously rotated during the sharpening process so as to generate the proper cutting surface shape. The sharpening process is normally carried out by bringing the tool to be sharpened into contact with a grinding wheel while simultaneously rotating the tool. My co-pending U.S. application Ser. No. 588760, filed Mar. 13, 1984, discloses a semi-automatic grinding machine for sharpening these types of cutting tools. The tools to be sharpened are normally held in collets of the type having longitudinally elongated jaws that are biased normally open and are caused to engage and frictionally hold the tool by a surrounding spindle that collapses the jaws around the tool.

Additionally, automatic opening and closing collet type holders have been designed, however, while these holders are effective, it would be desirable to provide for a continuously rotating tool holder that includes protection from damage due to lock up should either the spindle or collet become jammed during operation.

SUMMARY OF THE INVENTION

Briefly, the preferred embodiment of the invention provides a tool holder having a rotating collet driven directly by a spindle driver shaft connected to a power source. Another feature of the invention provides for a spindle surrounding the collet to be driven indirectly by the spindle driver shaft through a torque limiting coupling to prevent a lock up of the device in the event the spindle becomes jammed. And, in accordance with another important feature of the invention, a fluid responsive actuator provides for automatic movement of the collet between open and closed positions for engaging and releasing the tool.

BRIEF DESCRIPTION OF THE DRAWINGS

The present invention will be better understood by a reading of the following detailed description taken in connection with the accompanying drawings wherein.

DETAILED DESCRIPTION OF THE PREFERRED EMBODIMENT

Figure 1:
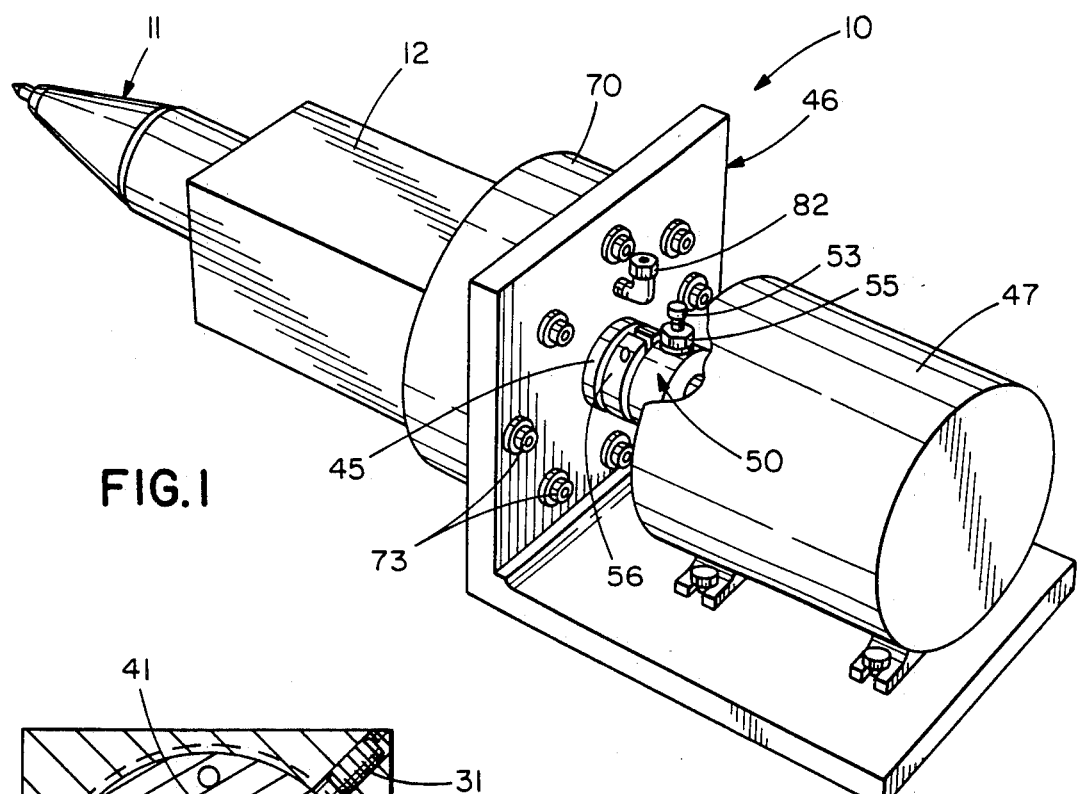
FIG. 1 is a perspective view of the preferred embodiment of the invention.

Referring to FIG. 1, there is shown generally as Numeral 10 a rotary tool holder. Rotary tool holder 10 holds a cutting tool carrier 11 which in turn holds a cutting tool such as a carbide bit to be sharpened. The rotary tool holder of the present invention is for use with an automatic or semi-automatic grinding machine such as that disclosed in my co-pending application Ser. No. 588760 filed Mar. 13, 1984, for Semi-Automatic Grinding Machine for grinding miner bits. While the rotary tool holder disclosed herein is for use with that apparatus, those skilled in the art can readily adapt the holder to other machines and the invention is not to be limited to that application.

Figure 3:
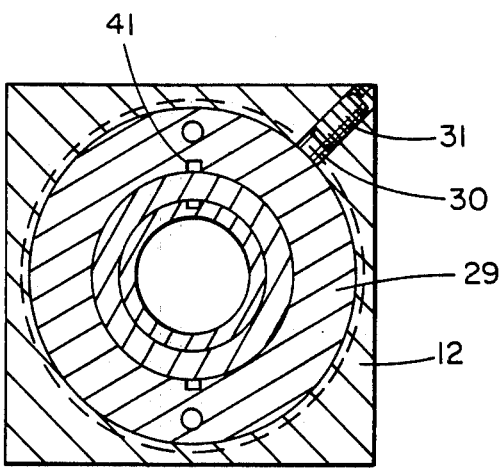
FIG. 3 is a transverse section along 3—3 of FIG. 2.
Figure 2:
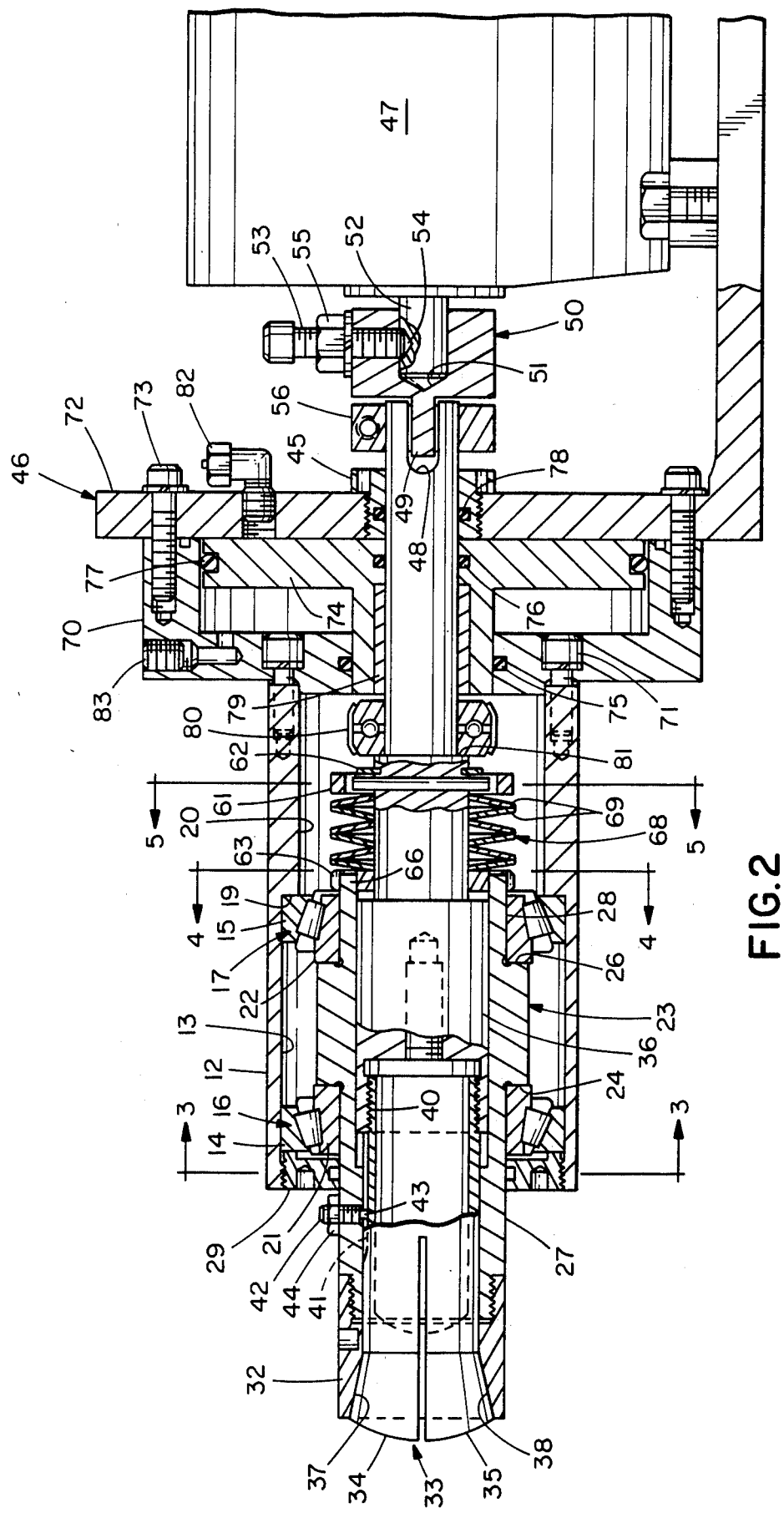
FIG. 2 is a longitudinal cross-sectional view of the preferred embodiment showing details of construction.

Holder 10 includes a housing 12, shown in FIGS. 1 and 2, as being made from a square section of steel stock. Housing 12 includes a bore 13 within which outer races 14, 15 of each of two tapered roller bearings 16, 17 are positioned. Innermost bearing 17 is retained axially within housing 12 against a shoulder 19 formed by large bore 13 and smaller bore 20. Inner races 21, 22 of the bearings are mounted on a spindle 23 and abut respective shoulders 24, 26 formed by reduced spindle diametrical surfaces 27, 28. An end cap 29 is threaded into the end of housing 12 adjacent outer bearing 16 and provides for retention and preload adjustment of the bearings. After proper preload of the bearings is attained by advancing end cap 29 against the outer bearing, a nylon insert 30 located in a hole in housing 12 adjacent the end cap is tightened against the threads on the end cap by advancing a set screw 31, see FIG. 3. It can be seen that bearings 16, 17 when so adjusted provide for alignment and rotational mounting of spindle 23 within the housing.

As shown in FIG. 2, spindle 23 is generally cylindrical and has an internal circular passage coaxial with its axis of rotation. The spindle also includes an extension 32 threaded onto its end that protrudes from housing 12. Typically, that portion of the spindle adjacent to the work piece, in this case the spindle extension is most vulnerable to damage during operation. It can be seen that if damage does occur to the spindle extension, the extension can be easily removed and replaced without the need to remove the entire spindle assembly from the housing.

A collet 33 of the type having a plurality of elongated jaws, such as 34, 35, is threaded onto the end of a drawbar driver shaft 36. Collet 33 is of the type wherein the jaws have outwardly extending surfaces such as 37, 38 for mating with a complementary surface within spindle extension 32. The jaws of the collet are normally biased by internal spring forces toward an expanded open position. When the collet is received within the spindle, the expanded jaws are collapsed to the closed position by the mating internal surfaces of the spindle extension and spindle. As fully set out below, drawbar driver shaft 36 turns in counterclockwise direction, as viewed from the motor end of the holder. Shaft 36 rotates opposite to the direction of rotation of a grinding wheel against which the tool being rotated by the holder is positioned. The spindle drawbar driver shaft includes right hand internal threads 40 for engaging corresponding right hand external threads on collet 33. As shown in FIG. 2, collet 33 includes a longitudinal slot 41 into which tip 43 of a screw 42 extends. Screw 42 is secured by a lock nut 44 and serves to locate the collet within the spindle. As set out below, screw tip 43 acts as a shear pin and is designed to shear off if the spindle is jammed against rotation.

Still referring to FIG. 2, drawbar driver shaft 36 passes into the spindle internal passage and, as set out above, threadly engages collet 33 therein. If the spindle should become jammed, shear pin 43 will shear off allowing drawbar driver shaft 36 to rotate within spindle 23.

The drawbar driver shaft passes through a bushing 45 in a collet actuator 46 and is connected to a drive motor 47. The connection to motor 47 is accomplished by including a slot 48 in the end of the drawbar driver shaft for receiving a tang 49 on a connector 50. Clearance is provided between tang 49 and slot 48 so that the drawbar driver shaft is free to move fore and aft to open and close the collet as set out below. A locking bolt 53 passes through connector 50 and is received in a spotted hole 54 on motor shaft 52 making a positive connection to the drawbar driver shaft. A lock nut 55 secures the locking bolt in place. A split collar 56 may be fitted around the slotted portion of the drawbar driver shaft to make the tang to slot connection more secure if desired.

Figure 4:
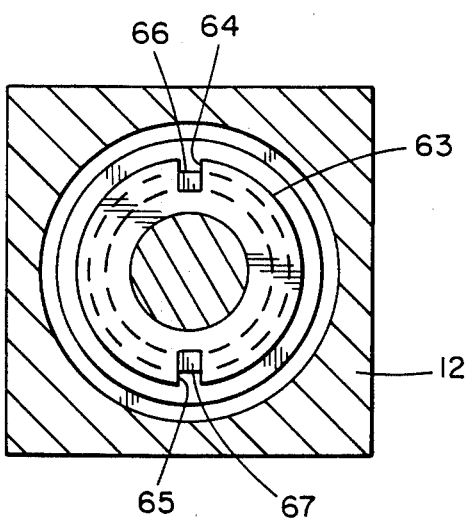
FIG. 4 is a transverse section along 4—4 of FIG. 2.
Figure 5:
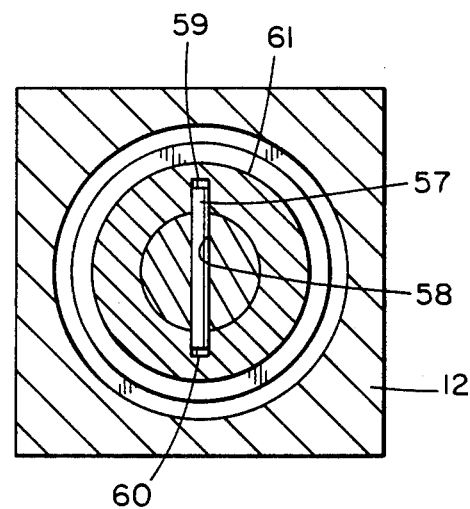
FIG. 5 is a transverse section along 5—5 of FIG. 2.

A drive coupling, shown generally as 68 in FIG. 2, is located in the portion of the housing formed by small diameter bore 20. As best shown in FIGS. 2 and 5, a pin 57 passes through a hole 58 in the drawbar driver shaft and is received in opposing slots 59, 60 in the inner surface of a drawbar driver washer 61. A snap ring 62 axially retains drawbar driver washer 61 on the drawbar driver shaft. Referring to FIGS. 2 and 4 drawbar driver shaft 36 passes through a spindle driver washer 63 which is free to rotate independently of the drawbar driver shaft. As shown in FIG. 4, spindle driver washer 63 includes opposing slots 64, 65 on its periphery into which dogs 66, 67 on the end of the spindle fit. Interposed between the drawbar driver washer and the spindle driver washer and around the drawbar driver shaft is a disc spring 68 made up of a plurality of concavo-convex shaped discs, such as 69 in FIG. 2. The discs are positioned on the shaft so that adjacent discs each have the same surface contour facing each other. Spring 68 is compressed between the drawbar driver washer and spindle driver washer a predetermined amount so as to generate a frictional force between all of the mating surfaces of the spring and washers to transfer a predetermined level of torque from the drawbar driver shaft to the spindle. As shown in FIG. 2, the torque developed by the drawbar driver shaft is transmitted through spring 68 to the spindle driver washer which is positively connected to the spindle through dogs 66, 67. Spindle 23 is thereby caused to rotate with the drawbar driver shaft.

Collet actuator 46 includes a cylinder member 70 mounted to the housing through fasteners 71 and a backing plate 72 similiarly mounted to the cylinder member through fasteners 73. Backing plate 72 also functions as a mounting base for the motor. A piston 74 is positioned within the cavity formed by the cylinder and backing plate and is sealed by o-rings 75, 76, 77, 78. Piston 74 includes a bushing 79 and moves on drawbar driver shaft 36 within the cylinder. A thrust bearing 80 on the drawbar driver shaft is interposed between one end of the piston and a shoulder 81 on the shaft. The backing plate includes an inlet 82 for introducing a fluid into the cylinder on the back side of the piston. The cylinder member also includes an auxiliary fluid hole 83 that can be used in alternative ways. For example, the cavity can be pressurized on the forward side of the piston to assist the return of the piston to the closed position as set out below, or the cavity can be vented through hole 83 to the atmosphere.

OPERATION

In operation, when it is desired to sharpen a tool bit, such as a miner bit, preferably air is first introduced behind piston 74 through inlet 82. A pressure differential is created across the piston which causes the piston to move to the left as viewed in FIG. 2, which in turn, pushes thrust bearing 80, against shoulder 81 causing drawbar driver shaft 36 to move to the left. In response to the movement of the drawbar driver shaft, disc spring 68 begins to collapse allowing the drawbar driver shaft and collet to continue moving to the left. The collet expands open as it is pushed from the spindle extension. The tool bit carrier may then be inserted into the collet. The air pressure on the piston is then relieved and spring 68 pushes, through drawbar driver washer 61 and snap ring 62, the drawbar driver shaft, bearing and piston to the right, as viewed in FIG. 2. The collet is drawn back into the spindle extension and closes around the tool carrier.

The driver motor is then activated either manually or automatically and the operation desired is performed. To remove the tool carrier from the collet, air is reintroduced behind piston 74 and the collet is opened as heretofore set out allowing the tool carrier to be removed.

As mentioned above, the collet to drawbar driver shaft threaded connection includes threads that will cause the collet to unscrew from the shaft should the collet become jammed. For example, for a counter-clockwise direction of rotation of motor 47 and drawbar driver shaft 36, the collet to shaft connection would be through right hand threads. In normal operation, the collet will remain threaded onto the drawbar driver shaft regardless of the loosening type threaded attachment due to the friction between the collet and spindle surfaces as well as the retention achieved through shear pin 43. Should the collet become jammed, the drawbar driver shaft is able to continue rotating first, because the threaded connection will allow the drawbar driver shaft to unthread from the jammed collet, and also because the shear pin will either shear off, thereby allowing the spindle to rotate independently from the collet, or if the shear pin does not shear off, the coupling will slip along the frictional surfaces between the discs and washer. The risk of locking up the drive motor is thereby minimized.

Should the spindle, rather than the collet, become jammed, shear pin 43 shears off allowing the collet to rotate independently from the spindle. The frictional force generated in the coupling is overcome and the coupling slips along the various frictional surfaces, thereby limiting the transmission of torque from the drawbar driver shaft to the predetermined maximum level as determined by the degree of spring compression. In this way lock up of the drive motor due to jamming of the spindle is minimized.

As set out hereinabove, the rotating tool holder disclosed herein is intended for use with an automatic or semi-automatic machine, and therefore, the collet actuator, as well as actuation of the drive motor, can be controlled by appropriate control means which do not form a part of the present invention.

Having described the preferred embodiments of the invention those skilled in the art having the benefit of said description and the accompanying drawings can readily devise other embodiments and modifications. Therefore, said further embodiments and modifications are to be considered to be included within the scope of the appended claims.

What is claimed is:
1. A rotary tool holder comprising:
a housing;
a substantially cylindrical spindle mounted for rotation within said housing;
a collet within said spindle moveable between an open and a closed position for holding the tool;

a shaft connected to said collet for moving said collet between the open and closed positions and for rotating said collet;

means for rotating said shaft;

means for longitudinally moving said shaft into said open and closed positions; and means for transferring torque from said rotating shaft to said spindle for rotating said spindle, said means for transferring torque including means for limiting said torque transmitted to a predetermined maximum level providing for protection of the holder from an overload force on said spindle.

2. The holder defined in claim 1 wherein said shaft is connected to said collet by threads having a direction of rotation for advancing said collet onto said shaft that is the same as the direction of rotation of said shaft during operation, whereby said shaft and collet unthread and separate if said collet becomes jammed while said shaft is rotating.

3. The holder as defined in claim 2 further comprising:

a shear pin extending through said spindle into a receptacle in said collet for locating said collet in said spindle, said pin adapted to shear off upon jamming of said spindle providing for independent rotation of said shaft and collet within said jammed spindle.

4. The holder as defined in claim 1 further comprising: said means for moving said shaft and collet between the open and closed positions is in response to an external signal.

5. The holder as defined in claim 4 wherein said means for moving said shaft and collet comprises:

a member having an internal cavity mounted to said housing and having said shaft passing therethrough;

a piston within said cavity mounted for slidable movement on said shaft in response to said external signal;

a thrust bearing mounted on said shaft between said piston and a shoulder on said shaft responsive to the movement of said piston for moving said shaft and collet to the open position; and a resilient means engaging said shaft for moving said shaft and collet to the closed position.

6. The holder as defined in claim 5 wherein said external signal, is a fluid pressure differential applied across said piston.

7. The holder as defined in claim 6 wherein said fluid is air.

8. The holder as defined in claim 1 wherein said means for transmitting torque comprises:

a frictional member associated with said shaft and spindle defining a rotational frictional connection between said shaft and spindle, generating a predetermined frictional force at said connection for transmitting said predetermined maximum level of torque, said connection slips when said frictional force is exceeded, thereby limiting the transmission of torque through said connection to said predetermined maximum level.

9. The holder defined in claim 8 wherein said frictional member comprises:

a first drive member fixedly attached to said shaft for rotation therewith;

a second drive member fixedly attached to said spindle for driving said spindle; and a resilient member between said first and second drive members defining at least one rotational, frictional connection between said first and second drive members, said resilient member being compressed a predetermined amount for exerting a predetermined frictional force on said connection providing for the transmission of said predetermined maximum level of torque therethrough to said second drive member, said connection slips when the torque on said connection exceeds said predetermined maximum level, thereby limiting the transmission thereof to said predetermined maximum level.

10. The holder as defined in claim 9 wherein said resilient member normally biases said shaft and collet to the closed position.

11. The holder as defined in claim 9 further comprising:

an actuator for moving said shaft and collet to the open position in response to an external signal.

12. The holder as defined in claim 11 wherein said actuator comprises:

a member having a central opening therethrough and a cavity, said member mounted to said housing with said shaft extending through the central opening;

a piston mounted for slidable movement on said shaft within said cavity in response to a fluid pressure signal thereon; and a thrust bearing mounted on said shaft operatively associated with said piston and shaft for moving said shaft and collet from the closed position to the open position in response to the movement of said position.

13. The holder as defined in claim 9 wherein said resilient member comprises:

a plurality of discs having parallel concavo-convex surfaces positioned side by side on said shaft with adjacent discs having the same surface shape facing each other.

* * * * *